Feb. 28, 1939.   W. R. WILEY   2,148,848
CLIP
Filed Nov. 9, 1936

INVENTOR.
William R. Wiley.
BY
Harness, Dickey, Pierce & Hann.
ATTORNEYS.

Patented Feb. 28, 1939

2,148,848

UNITED STATES PATENT OFFICE 2,148,848

CLIP

William R. Wiley, Detroit, Mich.

Application November 9, 1936, Serial No. 109,924

2 Claims. (Cl. 24—259)

The present invention relates to clips. More particularly, it relates to a novel and extremely simple form of clip construction which will find practical utility for securing listing strips to the top of a vehicle such as are conventionally used for the purpose of supporting the fabric inner trim material interiorly of the roof of the vehicle.

Many and various different means have been utilized heretofore for securing listing strips in position and it is a primary object of the present invention to provide a construction for securing such listing strips which is extremely permanent, simple, cheap to manufacture, and one which greatly facilitates the convenient installation of the inner trim material within a vehicle body.

The clips forming the subject matter of the present invention, while having a number of features in common, may be provided in either one of two different forms and are in each instance adapted to secure the listing in predetermined position with respect to an arcuate transversely extending bow member or similar structure disposed interiorly of the roof of the vehicle and provide a convenient means for anchoring the listing strips in position.

In one form, the present invention contemplates the provision of a clip which includes a generally U-shaped body portion having means for positively locking the clip in position upon the marginal edge of a sheet metal member anchored to the top and also includes a prong or pointed projection which may be used to impale the listing strip to anchor the same in predetermined position.

In another form, the present invention contemplates the construction of a clip which has not only means for anchoring the clip in position with respect to the top but has an extending portion which provides convenient means for resiliently clamping the listing strip between the clip and the member to which the clip is anchored.

Many other and further objects, advantages, and features of the present invention will become clearly apparent from the folowing specification when considered in connection with the accompanying drawing.

In the drawing:

Fig. 4 is a fragmentary transverse sectional view similar to Fig. 2 illustrating in detail a modified form of the invention and the manner in which the same is mounted;

Figure 1:
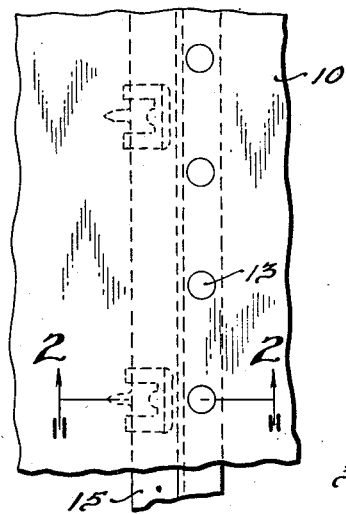
Figure 1 is a fragmentary interior view of a portion of a vehicle top illustrating one form of the improved clips utilized for the purpose of anchoring inner trim material in position.
Figure 2:
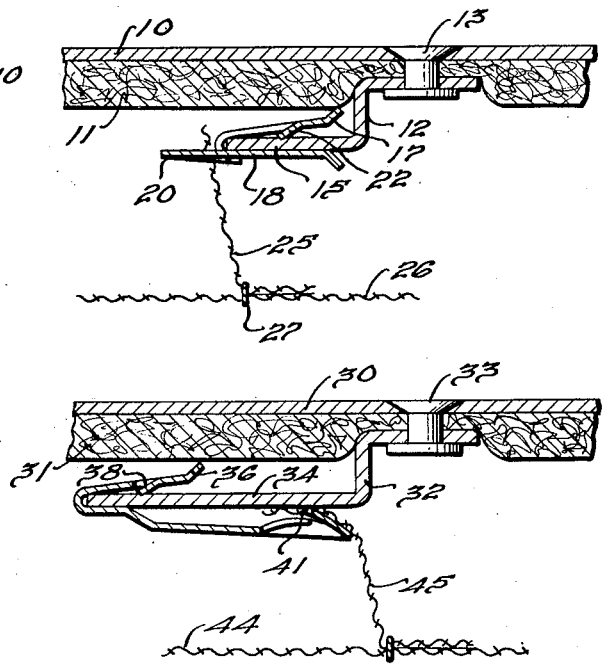
Fig. 2 is an enlarged transverse sectional view taken substantially on the line 2—2 of Fig. 1 illustrating in detail one form of clip and the manner in which the same is used.
Figure 3:
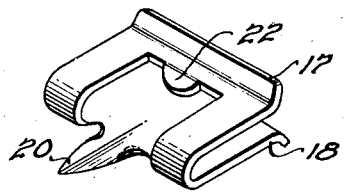
Fig. 3 is a perspective view of a clip embodying the inventive features of the present application.

With more particular reference to the drawing, and particularly to the form of the invention shown in Figs. 1, 2, and 3 thereof, it will be seen that while the clips of the present invention may find broad and practical utility in many and various different fields, the primary field of application for which the clips of the present invention are intended is that of anchoring strips of listing in position in order to accurately and conveniently mount the decorative fabric inner trim material conventionally supported inwardly of the roof of an automotive vehicle body.

In the specific form of the invention disclosed, a portion of a vehicle body top 10 is shown which, as is conventional in constructions of this general character, has closely adjacent the interior surface thereof a relatively thick layer of fibrous soundproofing material 11, which soundproofing material may be secured to the top panel 10 in a substantially conventional manner. At suitable intervals throughout the length of the top, transversely extending sheet metal strips 12 are provided which strips are anchored to the top by means of rivets 13 as shown, and in the construction shown in Figs. 1 to 4 of the drawing, these sheet metal strips 12 are secured interiorly of the soundproofing material and anchored to the top therethrough. In many instances these strips, mounted in the manner disclosed in the drawing, may be conveniently utilized for positively anchoring the soundproofing material 11 in predetermined position with respect to the sheet metal top panel 10 with which this soundproofing material is associated. The strip of metal 12 is offset to provide a projecting flange 15 which extends in a direction substantially parallel to the top panel 10 and is disposed in spaced relation with respect to the surface of the soundproofing material 11 and, as will hereinafter be more clearly seen, serves to provide convenient means for anchoring the improved clips of the present invention.

The clips are each preferably formed from a suitable substantially rectangular sheet of metal bent upon itself to provide a generally U shaped structure having arms 17 and 18 disposed substantially parallel to each other and in spaced relation. The central portion of the sheet of metal from which the clip is formed is preferably cut out to provide a forwardly projecting prong 20 which prong extends a substantial distance forwardly from the base of the U shaped member and, likewise, in substantially the same plane and in continuation of the arm 18 of the U shaped portion of the clip. At the time the metal from the interior portion of the clip is cut out, a lug 22 is formed in this cut out portion integrally with the arms 17 of the U shaped member which lug is preferably bent downwardly at an angle to the plane in which the arm 17 of the U shaped member normally lies. The extreme marginal edges of the arms 17 and 18 may be bent at angles to provide a diverging mouth for the U shaped portion of the clip to facilitate the mounting thereof, as will hereinafter become more clear.

The clip is preferably formed of relatively high carbon steel and is heat treated or tempered in order to materially increase its hardness and resiliency and is preferably hardened sufficiently so that it will be substantially harder than the flange 15 of the sheet metal strip 12 on which the clips are adapted to be mounted.

It will be clear that the clips may be conveniently inserted upon the projecting flange 15 and that this flange will be received between the arms 17 and 18 of the U shaped member, the flanged ends of these arms serving to guide the flange between the arms at the time the clip is mounted in position. Due to the fact that the clip is formed of harder steel than the flange, after it has been inserted in position, the lug 22 will, in the event there is any tendency to displace the clip, dig into the metal of the flange thus positively locking the clip in position and virtually precluding relative movement thereof with respect to the flange. After the clips have been mounted in position, it will be seen that the prongs 20 thereof will project forwardly from the flange and provide sharp points on which a listing strip 25 may be impaled to secure the listing strip in predetermined position with respect to the vehicle top. As is conventional in constructions of this general character, it is desirable to support the inner trim material 26 in position substantially spaced from the soundproofing material and top panel of the vehicle and to maintain such inner trim material not only in predetermined position, but properly tensioned at all times. In order to achieve this end, the listing strips 25 are usually stitched to the fabric trim material 26 by means of a line of stitching 27 and the listing strips are then impaled upon the projecting points or prongs 20 to secure the inner trim material in predetermined position.

The present invention makes possible particularly satisfactory installations of inner trim material because the workman installing the inner trim material is able to accurately tension the same to the predetermined desired tension and maintain such tension by impaling the listing strips upon the prongs. Furthermore, up until the time the listing strip is actually anchored in place, he has a definite feel of the tension which is imposed upon the listing and is, therefore, able to accurately tension the same.

Figure 5:
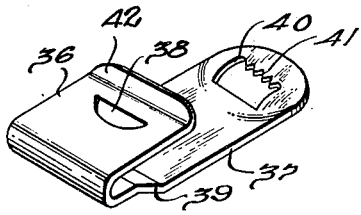
Fig. 5 is a perspective view of the modified form of clip shown in section in Fig. 4.

In the modified form of the invention shown in Figs. 4 and 5 of the drawing, a somewhat modified form of clip construction is shown and it will be readily understood that due to the modification of this clip structure, it is essential that a somewhat modified transversely extending bow member be utilized. In this form of the invention a vehicle top 30 has a layer of soundproofing material disposed over the inner surface thereof. Suitable transversely extending strips of metal 32 are disposed at longitudinal intervals throughout the length of the top and, as has been described above, these strips may be anchored in position by means of suitable rivets 33 passing through the strips, soundproofing material, and anchored in the top 30 of the vehicle body. The strips 32 are provided with relative wide offset flanges 34 which, when the strips are anchored in place, will inherently lie in spaced relation and parallel to the interior surface of the soundproofing material 31. The modified form of clip includes a sheet metal member bent to substantially U shaped form to provide arms 36 and 37, one of which arms is substantially longer than the other. The arm 36 is provided with an upstruck lug 38 preferably located at the transverse center of the arm, which serves to anchor the clip in position upon the flange 34 in the manner described above. The leading edge 42 of arm 36 is also preferably flared outwardly, and the lug or tab 38 slopes inwardly and away from the flared edge. The arm 37 is offset at 39 in order that the majority of this arm will, when the clip is anchored upon the flange 34, lie in spaced relation with respect to this flange and lie in a plane more remote from the arm 36 than that portion of the arm 37 adjacent the base of the clip. The outer end of the arm 37 is dished downwardly and is cut out to provide an aperture 40 therein, the forward wall of the aperture being preferably preformed to provide a plurality of teeth 41. The clip, as was the case in connection with the clips described above, is formed of relatively high carbon steel and after being stamped, are bent to the predetermined desired form and hardened. It will be seen that when the clip is anchored in position, as is shown in Fig. 4 of the drawing, the teeth 41 will be resiliently and frictionally urged into engagement with the under surface of the flange 34 of the strip 32. It will further be seen that the lug 38 serves to firmly anchor the clip in predetermined position upon this flange. In this form of the invention, the fabric inner trim material 44 may have listing strips 45 secured thereto, the upper marginal edges of which may be inserted between the flange 34 and arm 37 of the clips thus firmly and frictionally locking the listing in predetermined desired position.

Figure 6:
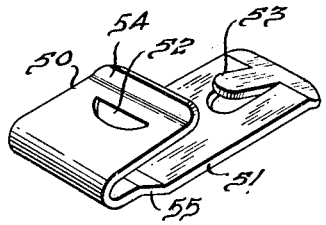
Fig. 6 is a perspective view of a still further modified form of the invention illustrating a clip having a modified type of gripping means.

In Fig. 6 is shown a still further modified form of the invention which is quite similar to that just described. In this form, the clip comprises a U shaped member having arms 50 and 51 substantially identical in construction to the arms 36 and 37 described above. The arm 50 corresponds to the arm 36 and preferably includes the flared edge 54, corresponding to the edge 40. The arm 50 has an upstruck lug 52, corresponding to the lug or tab 38, for locking the clip in predetermined position upon the flange with which it is associated. The arm 51 is also provided with an offset 55 so that the major portion of the arm lies in a plane more remote from the arm 50 than that portion of the arm 51 adjacent the base of the clip. The arm 51 is provided with an up-struck projection 53 which serves to frictionally engage the surface of the flange on which the clip is mounted and provide means for frictionally clamping the listing strip in position. As shown in Fig. 6, the projection 53 extends inwardly and away from the leading edge of arm 51.

Figure 7:
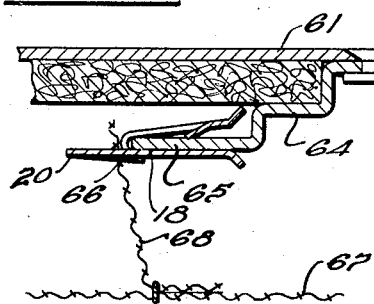
Fig. 7 is a transverse sectional view through a portion of the vehicle top similar to Figs. 3 and 4 illustrating a modified form of means for mounting the clips of the present invention.

Figure 7 illustrates a modified form of a transversely extending strip which includes a channel member 60 directly secured to the top 61 of the vehicle. This channel member 60 has a laterally extending flange 62 on one side thereof which serves to provide a recess adapted to receive the marginal edge of a section of soundproofing material 63. The opposite side of the channel member has a similar flange 64 which serves to provide a similar recess on the opposite side of the strip and it is noted that the flange 64 is offset to provide a clip receiving flange 65 disposed in spaced relation and parallel to the soundproofing material and serving to provide means for mounting a plurality of clips 66 similar in construction to those shown in Fig. 3. In this form of the invention, inner trim material 67 may have listing strips 68 stitched thereto and these listing strips may be impaled upon the projections of the clip 66.

It will be readily understood that the above described forms of the invention are merely illustrative of the generic inventive concept presented in the present application. Many other and further modifications thereof falling within the scope of the invention as defined in the subjoined claims will become clearly apparent to those skilled in the art.

What is claimed is:

1. A clip comprising a sheet metal member of high carbon steel which is tempered and hardened, said member being of substantially U-shape to provide first and second arms, the leading edge of said first arm being outwardly flared, said first arm having an integral inturned tab adjacent said outwardly flared edge, said tab being located at the transverse center of said first arm and sloping inwardly and away from said flared edge, said second arm having two portions, one of which is displaced outwardly to lie in a plane more remote from said first arm than the other portion, an integral inturned tab formed in said second portion of said second arm adjacent the leading edge thereof, said inturned tab sloping inwardly and away from the leading edge of said second arm.

2. A clip for permanently securing an object to a backing member comprising a sheet metal member of high carbon steel which is tempered and hardened, said member being of substantially U-shape to provide first and second arms, the leading edge of said first arm having an outwardly flared edge, said first arm having an inturned tab adjacent said outwardly flared edge, said tab being located at the transverse center of said first arm and sloping inwardly and away from said bent edge, said second arm having two portions, one of which is displaced outwardly to lie in a plane more remote from the said first arm than the other portion, said second named portion having integral inwardly extending friction means thereon.

WILLIAM R. WILEY.